No. 610,793. Patented Sept. 13, 1898.
C. E. BERRY.
DRAFT APPARATUS.
(Application filed Sept. 18, 1897.)
(No Model.) 2 Sheets—Sheet 1.
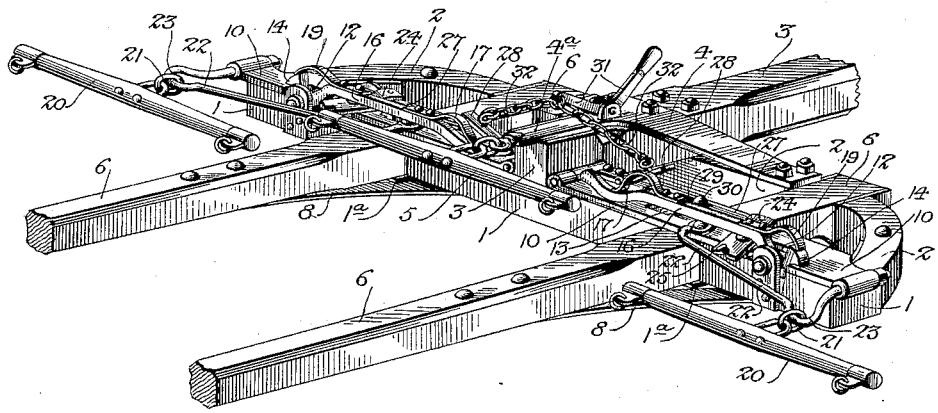
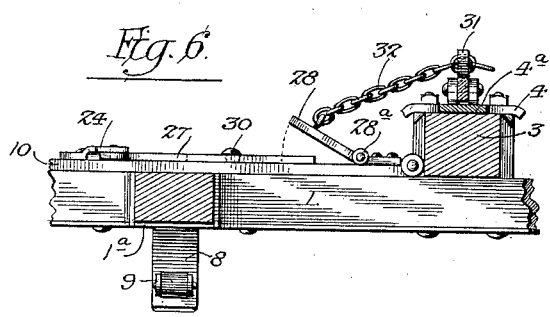
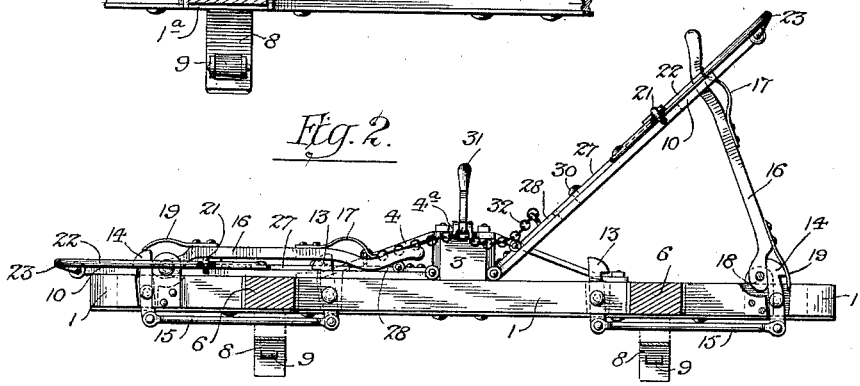
Witnesses:—
Louis M. F. Whitehead
Inventor:—
Charles E. Berry
By his Attorneys,
C. A. Snow & Co.

No. 610,793. Patented Sept. 13, 1898.
C. E. BERRY.
DRAFT APPARATUS.
(Application filed Sept. 18, 1897.)
(No Model.) 2 Sheets—Sheet 2.
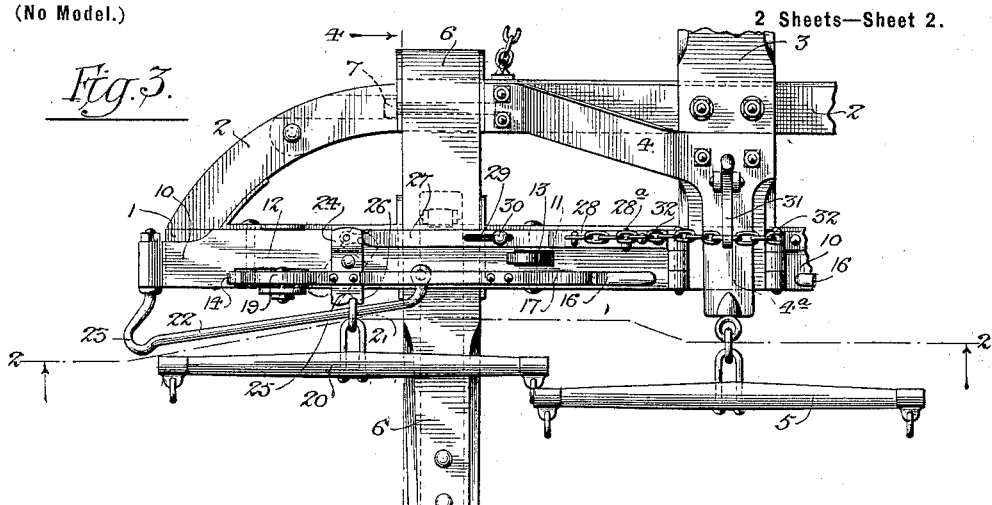
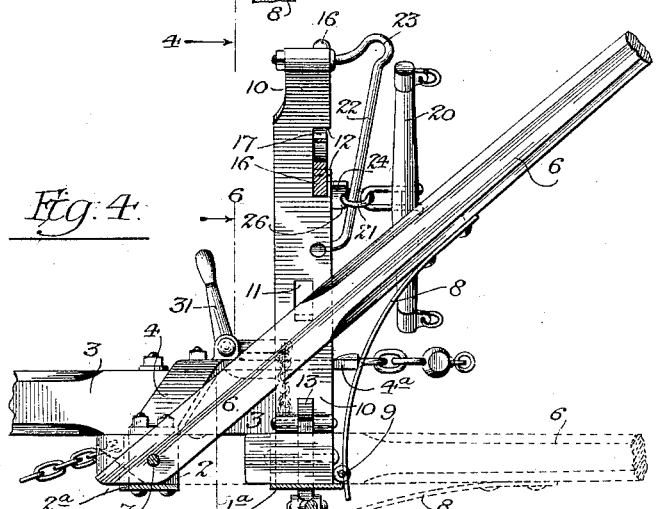
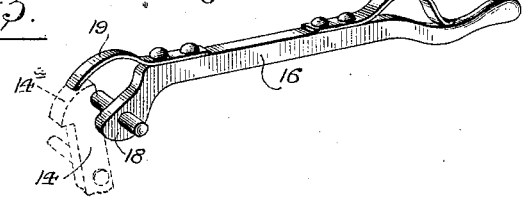
Witnesses:— Louis M. Whitehead.
Inventor:— Charles E. Berry
By his Attorneys, C. A. Snow & Co.

UNITED STATES PATENT OFFICE.

CHARLES E. BERRY, OF CAMBRIDGE, MASSACHUSETTS.

DRAFT APPARATUS.

SPECIFICATION forming part of Letters Patent No. 610,793, dated September 13, 1898.

Application filed September 18, 1897. Serial No. 652,127. (No model.)

*To all whom it may concern:*

Be it known that I, CHARLES E. BERRY, a citizen of the United States, residing at Cambridgeport, in the county of Middlesex and State of Massachusetts, have invented a new and useful Draft Apparatus, of which the following is a specification.

My invention relates to a draft apparatus or "hitch" of that class wherein provision is made for the attachment of three draft-animals driven abreast; and the object in view is to provide a three-horse hitch or draft apparatus of such a construction as to provide for driving through doorways, gateways, &c., of the ordinary width, or, in other words, to provide such a construction of parts as to enable the draft mechanism to be contracted transversely.

A further object of the invention is to provide means for facilitating the arrangement of the center or intermediate draft-animal in place, the side hitching devices being temporarily displaced for that purpose.

Further objects and advantages of this invention will appear in the following description, and the novel features thereof will be particularly pointed out in the appended claims.

In the drawings, Figure 1 is a perspective view of a draft apparatus constructed in accordance with my invention, showing the parts in their expanded or extended positions. Fig. 2 is a front view, omitting the whiffletrees, and showing the draft-tongues in section on the plane indicated by the line 2 2 of Fig. 3, one of the securing-plates being supported in its elevated or inoperative position. Fig. 3 is a partial plan view showing the parts in the transversely-contracted position. Fig. 4 is a longitudinal sectional view on the plane indicated by the line 4 4 of Fig. 3, showing in full lines the securing-plate and contiguous draft-tongue elevated to permit the introduction of the central draft-animal and showing in dotted lines the normal or operative position of the tongue. Fig. 5 is a detail view in perspective of the locking-lever detached. Fig. 6 is a detail transverse vertical section on the plane indicated by the line 6 6 of Fig. 4 to show the slide-lock in its disengaged position.

Similar numerals of reference indicate corresponding parts in all the figures of the drawings.

The apparatus embodying my invention includes a draft-frame consisting of front and rear transverse beams 1 and 2, the extremities of the latter being curved or otherwise extended forwardly and connected with the extremities of the former, and an attached beam or tongue 3, centrally attached to said transverse beam and adapted to be applied to the vehicle running-gear in place of the ordinary two-horse draft-tongue. An arched securing-strap 4 preferably extends over the fastening-tongue 3 and is terminally attached to the upper surface of the rear transverse beam 2, while the front arm $4^a$ of said arch serves as a means for attachment of the central or intermediate whiffletree 5.

Pivotally mounted for terminal elevation upon the frame just described are draft-tongues 6, their pivots 7 being arranged contiguous to their rear ends and supported by the rear transverse beam 2, in which the tongues are embedded, and the depression of the front extremities of the draft-tongues is limited by the front transverse beams through seats in which the tongues extend. In practice I prefer to embed the draft-tongues in the transverse beams of the draft-frame to arrange the upper surfaces of the former flush with those of the latter, as indicated, and the parts of said transverse beams upon opposite sides of the planes of the draft-tongues are connected and braced to give the requisite strength by means of metallic plates, such as those indicated at $1^a$ and $2^a$, respectively arranged upon the front and rear beams. It is obvious that other equivalent means may be employed for this purpose.

As above indicated, the draft-tongues when in their normal positions are flush at their upper sides with those of the transverse beams and rest upon the bracing or stop plates $1^a$, by which the bottoms of the seats in the front transverse beam are closed; but it is desirable, in order to facilitate the arrangement of the central or intermediate horse in his place between the draft-tongues, to provide means for supporting either of the tongues in an elevated position, such as that indicated, for instance, in Fig. 4. To accomplish this, I attach to each tongue a tongue-support consisting of a spring-arm 8, adapted at its free end to operate contiguous to the plate 1ª and preferably bear permanently at its upper surface against the front edge of said plate. Mounted upon this arm, contiguous to its free or rear end, is a stop 9, preferably consisting of an antifriction-roll which when the tongue is raised sufficiently snaps over the upper side of the stop-plate 1ª and is held in contact with the upper surface thereof by the rearward pressure of the contiguous lower portion or extremity of the arm. By reason of this engagement the tongue may be supported temporarily as desired for the purpose above named, whereas when it is required to lower the tongue it may be accomplished by disengaging the supporting-arm in any suitable manner, as by applying additional weight to the front end of the tongue, thus causing the rolling stop to pass over the front edge of the stop-plate.

In order that the draft-tongues may be permanently secured in their operative positions, I employ securing-plates 10, arranged upon the upper surface of the frame, preferably upon the transverse beam 1, to close the upper sides of the seats in said frame. Various means may be employed for mounting these securing or seat-closing plates; but that construction which I have found to be efficient in this connection involves the hinging of the plates at their inner ends to the frame, together with suitable locking devices for maintaining the plates in their normal positions. Each plate is preferably slotted, respectively, at intermediate and terminal points, as shown at 11 and 12, to receive the shouldered extremities of dogs or pawls 13 and 14, pivotally mounted upon the frame and adapted to project upwardly through said slots. To facilitate operation, these dogs or pawls are preferably connected, as shown by the link 15, and their shoulders are adapted to engage the plate at the ends of the slots when moved outwardly at their upper extremities. The means which I have devised for operating these dogs—namely, to engage and disengage the same—includes a locking-lever 16, pivotally mounted upon the frame within the terminal or outer slot 12 and adapted when elevated to allow the securing-plate 10 to be elevated at its free end, said lever, however, remaining extended through the slot 12. My object in so arranging the locking-lever is to adapt it to perform the function of a support for the securing-plate when the latter is elevated. In carrying out this object I provide the locking-lever with a bowed supporting-spring 17, also adapted to pass through the slot 12, but projected from the plane of the lever to such an extent as to necessitate its contraction or flexion in passing through said slot. Hence after the securing-plate has been elevated a sufficient distance to pass the supporting-spring 17 and is allowed to rest thereon the lever performs the function above-mentioned of holding the securing-plate in the position illustrated, for instance, in Fig. 2, and also indicated in Fig. 4.

The connection between the locking-lever, which when folded or arranged in its normal position, as shown at the left in Fig. 2, rests upon the upper surface of the supporting-plate, and the locking dogs or pawls 13 and 14 may be variously contrived to cause the disengagement of the same from the securing-plate when the lever is moved to the upright position indicated at the right in Fig. 2 and to cause the engagement of said dogs with the securing-plate when the locking-lever is reversely operated. The construction illustrated, however, embodies oppositely-located cams arranged, respectively, on the locking-lever and the pawl 14, the cam 18, which consists of an extension or enlargement of the locking-lever, being adapted to bear against the rear or inner side of the dog or pawl 14 to move the same outwardly or into its engaging position as the lever is lowered and the cam-face formed at the outer side of the dog or pawl being arranged in the path of a trip 19, carried by the locking-lever. This trip consists of a plate-spring adapted to terminally traverse the cam-surface of the dog 14 and repress the latter or move the same inwardly as the lever is raised to the position indicated at the right in Fig. 2. This construction of connection between the locking-lever and the dogs is preferable to others with which I have experimented, for the reason that it insures a positive operation of the dogs or pawls at each movement of the locking-lever, and hence is not dependent upon the operation of springs or their equivalents. When the locking-lever is in its depressed position, as indicated at the left in Fig. 2, the dogs are positively locked in engagement with the securing-plate, and displacement of the latter while the vehicle is in motion is impossible, whereas when the locking-lever is in its elevated position the dogs or pawls are positively held in their disengaged position and must so remain until the downward or folding movement of the locking-lever is commenced. Such downward or folding movement of the locking-lever cannot be instituted until the securing-plate shall have been disengaged from the same and lowered to its normal position to close the upper side of the tongue-seat in the frame. The cam-face of the outer or main dog or pawl 14 is illustrated at 14ª, (see Fig. 5,) and the relative proportions of the parts are such that when the locking-lever is in its depressed or normal position the trip 19 bears upon the upper end of said pawl, and thus forms a lock to hold the said arm in its normal position and prevent rattling thereof when the vehicle is in motion.

It is my object in constructing a device of the class thus far described not only to provide for transversely contracting the same, as before stated, but, so far as possible, to relieve the end portions of the draft-frame from the strain due to the draft upon the terminal or side whiffletrees 20. Hence I have fitted said whiffletrees to slide by means of rings 21 or their equivalents upon guides 22, projecting forwardly from the securing-plates 10 and provided at their outer ends with seats 23, with which the slides 21 are normally engaged, as shown in Fig. 1. The front sides of these guides are inclined rearwardly toward their inner ends, or, in other words, are diagonally disposed, and in order that the slides may be secured at an intermediate point of the guides contiguous to their inner ends when the whiffletrees are drawn inwardly, as indicated in Fig. 3, I employ pivotal holders or buttons 24, mounted upon the securing-plates and terminally arranged contiguous to the guides 22, with notches 25 to engage the slides 21, said buttons having projecting heels 26, which are so located with relation to the guides that when the slides 21 are moved inwardly they engage said heels, and thereby swing the buttons or holding devices into engaging position therewith. In other words, said heels constitute trips, which operate contiguous to the surfaces of the guides, and are permanently in the paths of the slides 21 when moving inwardly, whereby said slides cannot be moved to pass the buttons or holding devices without causing their engagement thereby. Connected with each button or holding device is a slide 27, mounted for longitudinal movement upon the contiguous securing-plate and normally held in its extended position, with the button in operative engagement with the slide of the whiffletree, by means of a latch 28. The slides are preferably slotted, as at 29, to operate in connection with guide-pins 30, and the latches are hinged, as at 28ª, upon the securing-plates, and are disposed, respectively, in alinement with the slides to resist inward thrust thereof. The latches are connected for disengagement from the slides to a shifting lever 31 by means of chains, cords, or similar flexible means, (shown at 32,) and said shifting lever is mounted upon the frame, preferably upon the spider formed by the arch 4 and its forwardly-extending arm 4ª, where it is within reach of the driver.

From the above description it will be seen that when it is desired to drive a vehicle provided with a draft apparatus embodying my invention through a narrow gateway or doorway the lateral whiffletrees should be forced inwardly until engaged by the buttons or holding devices, thus swinging the rear ends of said buttons outwardly and allowing the latches 28 to drop to their operative positions. (Indicated in Figs. 2 and 3.) After the vehicle has passed through the narrow passageway the rearward movement of the free end of the shifting lever 31 will release the latches from the slides 27 and allow the strain upon the whiffletrees, applied by the draft-animals, to displace said buttons, and thus release the slides to enable them to return to their terminal seats 23. I am enabled by the construction described to contract a draft apparatus having a lateral measurement from extreme to extreme of nine feet to a width of seven feet or less, and thus adapt a three-horse hitch to pass freely through doorways and gateways of less width than is possible in connection with a hitch of this class when constructed of the normal width. Furthermore, it will be seen that when it is desired to apply the draft-animals to the apparatus one of the locking-levers 16 should be swung upwardly at its inner free end to the position indicated at the right in Fig. 2, thus disengaging the dogs or pawls 13 and 14 from the securing-plate, then raising the free end of the securing-plate until caught by the supporting-spring 17 of said locking-lever, and finally raising the adjacent draft-tongue to the position indicated in full lines in Fig. 4 until the revoluble stop of the supporting-arm 8 snaps into engagement with the stop-plate 1ª. After properly placing the intermediate or central draft-animal the reversal of the above operation will accomplish the return of the parts to their normal positions, wherein they will be locked, as hereinbefore described, and will be adapted to perform their desired functions in connection with the application of draft to the vehicle.

Various changes in the form, proportion, and the minor details of construction may be resorted to without departing from the spirit or sacrificing any of the advantages of this invention.

Having described my invention, what I claim is—

1. A draft apparatus having side whiffletrees mounted upon guides for transverse inward adjustment, to allow contraction of the width of said apparatus, said guides being diagonally disposed, whereby the whiffletrees are normally held, under strain, at the outer ends of the guides, substantially as specified.

2. A draft apparatus having side whiffletrees mounted for lateral adjustment upon diagonally-disposed guides, whereby when released they are adapted, under strain, to seek their extended or outwardly-adjusted positions, and means for temporarily securing the whiffletrees in an inwardly-adjusted position, substantially as specified.

3. A draft apparatus having side whiffletrees mounted upon inwardly and rearwardly inclined guides for lateral adjustment and adapted for outward adjustment thereon when strained forwardly, holding devices arranged in operative relation with the guides contiguous to their inner ends, to engage and temporarily secure the whiffletrees in their inwardly-adjusted positions, and shifting devices having a common operating means for releasing said whiffletrees, substantially as specified.

4. A draft apparatus having side whiffletrees mounted upon guides for lateral adjustment, pivotal holding devices or buttons arranged in operative relation with the guides to swing in planes parallel therewith, and having notches to engage slides carried by the whiffletrees, and means for securing said holding devices or buttons against swinging movement when in engagement with the whiffletree-slides, substantially as specified.

5. A draft apparatus having side whiffletrees mounted for lateral adjustment by means of attached slides, and coöperating guides upon which the slides are mounted, pivotal buttons having terminal notches arranged in operative relation with the guides to engage said slides, said buttons also having heels or trips arranged permanently in the paths of the inward movement of the slides, and means for securing the buttons in their operative positions, substantially as specified.

6. A draft apparatus having side whiffletrees mounted for lateral adjustment by means of slides carried thereby, and transverse guides upon which said slides are mounted, pivotal buttons arranged in operative relation with the guides for engaging the slides contiguous to the inner ends of the guides, operating-slides connected with the buttons, latches for engaging the operating-slides, to hold the buttons in engagement with the whiffletree-slides, and shifting mechanism for disengaging the latches, substantially as specified.

7. A draft apparatus having side whiffletrees mounted for lateral adjustment by means of slides carried thereby, and transverse guides upon which said slides are mounted, pivotal buttons arranged in operative relation with the guides for engaging the slides contiguous to the inner ends of the guides, operating-slides connected with the buttons, latches for engaging the operating-slides, to hold the buttons in engagement with the whiffletree-slides, and shifting mechanism for disengaging the latches, said shifting devices consisting of a lever flexibly connected with the latches, substantially as specified.

8. A draft apparatus having a frame, and a pivotal tongue mounted upon the frame for vertical swinging movement, in combination with a supporting device for holding the tongue in an elevated position, the same consisting of a spring-arm carried by the tongue and provided with a movable stop, and a fixed stop arranged in the path of, for engagement by, said movable stop, the spring-arm being extended beyond the movable stop to bear upon the fixed stop, substantially as specified.

9. A draft apparatus having a frame, and a pivotal tongue mounted upon the frame for vertical swinging movement, in combination with a supporting device for holding the tongue in its elevated position, the same consisting of a spring-arm, attached to the tongue and provided contiguous to its free end with a revoluble stop projecting peripherally from the plane of the arm, and a fixed stop arranged in the path of said revoluble stop, the arm being extended beyond the revoluble stop to bear against the front end of the fixed stop, substantially as specified.

10. A draft apparatus having a frame, a pivotal tongue mounted upon the frame for vertical swinging movement upwardly from its normal position, a securing-plate mounted upon the frame for arrangement in the path of the tongue, and means for locking said securing-plate in its normal position, in combination with a supporting device for holding the tongue in its elevated position, the same consisting of a spring-arm, attached to the tongue and provided contiguous to its free extremity with a revoluble stop projecting peripherally from the plane of the arm, and a fixed stop-plate arranged in the path of said stop, the arm being extended beyond the stop to bear against the front end of the stop-plate, substantially as specified.

11. A draft apparatus having a frame, a pivotal tongue mounted upon the frame for vertical swinging movement upwardly from its normal position, said frame being provided with a seat to receive the tongue at an intermediate point, a movable whiffletree-carrying securing-plate mounted upon the frame to close the open side of the tongue-seat, and locking devices for securing said plate in its operative position, substantially as specified.

12. A draft apparatus having a frame, a pivotal tongue mounted for swinging movement upwardly from its normal position and fitted at an intermediate point in a seat in said frame, a whiffletree-carrying securing-plate hinged at one end to the frame for upward-swinging movement at its free end, and adapted, when in its normal position, to close the open side of the tongue-seat, and means for securing said plate in its normal or operative position, substantially as specified.

13. A draft apparatus having a frame, a tongue mounted for pivotal movement and fitted at an intermediate point in a seat in the frame, a whiffletree-carrying securing-plate mounted upon the frame to cover the open side of the tongue-seat, a dog for engaging the securing-plate in its normal position, and means for operating the dog to engage and disengage the securing-plate, substantially as specified.

14. A draft apparatus having a frame, a pivotal tongue mounted for vertical swinging movement and fitted at an intermediate point in a seat in the frame, a whiffletree-carrying securing-plate mounted upon the frame to close the open side of the tongue-seat, a plurality of connected pawls mounted upon the frame to engage and hold the securing-plate when in its normal position, and operating devices in connection with one of said pawls, substantially as specified.

15. A draft apparatus having a frame, a pivotal tongue mounted for vertical swinging movement, and fitted at an intermediate point in a seat in the frame, a securing-plate mounted upon the frame to close the open side of said tongue-seat, and locking devices for the securing-plate, including a dog or pawl, and a locking-lever operatively connected with the pawl and provided with means for engaging and supporting the securing-plate in its elevated or inoperative position, substantially as specified.

16. A draft apparatus having a frame, a pivotal tongue mounted for swinging movement in a vertical plane, and fitted at an intermediate point in a seat in the frame, a securing-plate for closing the open side of the tongue-seat, and locking devices for the securing-plate, including a dog or pawl, a locking-lever operatively connected with the dog or pawl, and a supporting-spring carried by the locking-lever to engage and hold the securing-plate in its elevated or inoperative position, substantially as specified.

17. A draft apparatus having a frame, a pivotal tongue mounted for vertical swinging movement, and fitted at an intermediate point in a seat in the frame, a securing-plate mounted upon the frame to close the open side of the tongue-seat, and locking devices for securing said plate in its normal position, the same including a dog or pawl to engage the plate, a locking-lever operatively connected with the dog or pawl and extending through a slot in the securing-plate, and a supporting-spring carried by the locking-lever contiguous to its free end, to engage said slot in the securing-plate and support the latter in its elevated or inoperative position, substantially as specified.

18. A draft apparatus having a frame, a pivotal tongue mounted for vertical swinging movement, and fitted at an intermediate point in a seat in the frame, a securing-plate mounted upon the frame to close the open side of the tongue-seat, and locking devices for the securing-plate, including a dog or pawl to engage the securing-plate, a locking-lever having a cam arranged in operative contact with the dog or pawl and adapted to move the latter into engagement with said plate when the lever is moved in one direction, and trip devices on the lever for disengaging the dog or pawl from the plate when the lever is moved in the other direction, substantially as specified.

19. A draft apparatus having a frame, a pivotal tongue mounted for vertical swinging movement, and fitted at an intermediate point in a seat in the frame, a securing-plate mounted upon the frame to close the open side of the tongue-seat, and locking devices for the securing-plate, including a dog or pawl having a cam-face, a locking-lever having a cam arranged in operative relation with the rear side of the dog or pawl, and adapted when swung in one direction to move the dog into engagement with the securing-plate, and a trip-arm on the lever operatively engaged with the cam-face of the dog for disengaging the latter from the securing-plate, when the lever is swung in the opposite direction, substantially as specified.

20. A draft apparatus having a frame, a pivotal tongue mounted for vertical swinging movement, and fitted at an intermediate point in a seat in the frame, a securing-plate mounted upon the frame to close the open side of the tongue-seat, and locking devices for the securing-plate, including a dog or pawl having a cam-face, a locking-lever having a cam arranged in operative relation with the rear side of the dog or pawl, and adapted when depressed to move the dog into engagement with the securing-plate, and a yielding trip-arm operatively engaged with the cam-face of the dog, and adapted, when the lever is depressed, to bear upon the upper end of the dog to maintain said lever in its folded or normal position, substantially as specified.

21. A draft apparatus having a frame, a pivotal tongue mounted thereon for swinging movement and fitted at an intermediate point in a stationary seat, a pivotal securing-plate for closing the open side of the tongue-seat, a locking-lever for engaging and supporting the securing-plate when in its elevated or inoperative position, and locking-pawls, for engaging and holding the securing-plate in its depressed or operative position, substantially as specified.

22. A draft apparatus having a frame, a pivotal tongue mounted thereon for swinging movement and fitted at an intermediate point in a stationary seat, a pivotal securing-plate for closing the open side of the tongue-seat, a locking-lever for engaging and supporting the securing-plate when in its elevated or inoperative position, and locking-pawls, for engaging and holding the securing-plate in its depressed or operative position, said pawls being operatively connected with the locking-lever for movement to engage or disengage the securing-plate by movements, in opposite directions, of the locking-lever, substantially as specified.

In testimony that I claim the foregoing as my own I have hereto affixed my signature in the presence of two witnesses.

CHARLES E. BERRY.

Witnesses:
WILLIAM T. KING,
L. G. GREEN.